United States Patent
Zou et al.

(10) Patent No.: US 7,092,208 B2
(45) Date of Patent: *Aug. 15, 2006

(54) MAGNETIC TRANSDUCERS WITH REDUCED THERMAL POLE-TIP PROTRUSION/RECESSION

(75) Inventors: Jie Zou, Shakopee, MN (US); Jason Bryce Gadbois, Minneapolis, MN (US); Declan Macken, Prior Lake, MN (US); Michael Kautzky, Eagan, MN (US); David Christopher Seets, Minnetonka, MN (US); Ladislav Rudolf Pust, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 10/352,744

(22) Filed: Jan. 28, 2003

(65) Prior Publication Data
US 2004/0008451 A1 Jan. 15, 2004

Related U.S. Application Data

(60) Provisional application No. 60/395,019, filed on Jul. 11, 2002.

(51) Int. Cl.
*G11B 5/147* (2006.01)
(52) U.S. Cl. .................. 360/128; 360/126; 360/317
(58) Field of Classification Search ............. None
See application file for complete search history.

(56) References Cited

U.S. PATENT DOCUMENTS

| 5,490,028 A | 2/1996 | Ang et al. |
| 5,687,045 A | 11/1997 | Okai et al. |
| 5,710,683 A | 1/1998 | Sundaram |
| 5,764,056 A | 6/1998 | Mao et al. |
| 5,896,244 A | 4/1999 | Watanabe et al. |
| 5,898,542 A | 4/1999 | Koshikawa et al. |
| 5,949,627 A | 9/1999 | Williams et al. |
| 6,219,200 B1 | 4/2001 | Waki et al. |
| 6,366,428 B1 | 4/2002 | Yamanaka et al. |
| 6,661,605 B1 * | 12/2003 | Pust et al. ............. 360/126 |
| 2002/0006018 A1 | 1/2002 | Narumi et al. |
| 2003/0099054 A1 | 5/2003 | Kamijima |

* cited by examiner

*Primary Examiner*—Robert S. Tupper
(74) *Attorney, Agent, or Firm*—Kinney & Lange, P.A.

(57) ABSTRACT

A magnetic head having an air bearing surface is used to reduce thermal pole tip protrusion and recession. The magnetic head includes a substrate and a data transducer positioned upon the substrate adjacent the air bearing surface. The data transducer is comprised of a plurality of metallic layers. A compensation structure is positioned adjacent to at least one of the plurality of metallic layers, is exposed at the air bearing surface or recessed at the ABS and extends substantially perpendicular from the air bearing surface. The compensation structure is formed of a material having a coefficient of thermal expansion less than a coefficient of thermal expansion of a material forming the substrate.

34 Claims, 8 Drawing Sheets

ABS

MAGNETIC TRANSDUCERS WITH REDUCED THERMAL POLE-TIP PROTRUSION/RECESSION

CROSS-REFERENCE TO RELATED APPLICATION(S)

This application claims priority from provisional application No. 60/395,019 filed on Jul. 11, 2002, for "COMPENSATION SCHEMES TO REDUCE THERMAL POLE-TIP PROTRUSION/RECESSION IN MAGNETIC TRANSDUCERS" by Jie Zou, Jason Bryce Gadbois, Declan Macken, Michael Kautzky, David Christopher Seets, and Ladislav Rudolf Pust.

BACKGROUND OF THE INVENTION

The present invention relates generally to the field of magnetic data storage and retrieval systems. In particular, the present invention relates to a thin film transducing head having improved performance due to a reduced thermal pole-tip protrusion and recession.

In a magnetic data storage and retrieval system, a thin film transducing head typically includes a transducer, a substrate upon which the transducer is built, and an overcoat deposited over the transducer. The transducer, which typically includes a writer portion for recording magnetically-encoded information on a magnetic media and a reader portion for retrieving that magnetically-encoded information from the magnetic media, is formed of multiple patterned layers successively stacked upon the substrate. The volume of the transducer is typically much smaller than both the volume of the substrate and the volume of the overcoat.

The layers of the transducer, which include both metallic and insulating layers, all have different mechanical and chemical properties than the substrate. These differences in properties affect several aspects of the transducer. First the layers of the transducing head will be lapped at different rates. Thus, when an air bearing surface (ABS) of the transducing head is lapped during its fabrication, different amounts of the layers will be removed, resulting in the transducing head having an uneven ABS. Commonly, a greater amount of the metallic layers of the transducer will be removed during the lapping process than will be removed from the substrate. Thus, this lapping process results in a pole tip recession (PTR) of the metallic layers of the transducer with respect to the substrate. The PTR of a particular layer is defined as the distance between the air bearing surface of the substrate and the air bearing surface of that layer.

The differing mechanical and chemical properties of the substrate and transducer layers affect the air bearing surface during operation of the transducing head. As the magnetic data storage and retrieval system is operated, the transducing head is subjected to increased temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer.

The coefficient of thermal expansion (CTE) of materials used in forming the substrate is typically much smaller than the CTE of materials used in forming the metallic layers of the transducer. Due to the large CTE of the transducer's metallic layers, those layers tend to expand a greater amount in response to high temperatures than the substrate. Thus, when the transducing head is subjected to high operating temperatures, the metallic layers tend to protrude closer to the magnetic disc than the substrate, thereby affecting the PTR of the transducer. This change in PTR caused by temperature is referred to as the Thermal PTR (TPTR).

During operation of the magnetic data storage and retrieval system, the transducing head is positioned in close proximity to the magnetic media. The distance between the transducer and the media is preferably small enough to allow for writing to and reading from the magnetic media with a large areal density, and great enough to prevent contact between the magnetic media and the transducing head. Performance of the transducer depends primarily upon the distance between the media and the transducing head.

To keep the distance between the transducing head and the magnetic media constant, PTR should not change significantly with temperature. If TPTR is large, then the spacing between the transducer and the media will change significantly with temperature, thereby requiring that the low temperature fly height be enough to accommodate the higher operating temperatures. On the other hand, if TPTR is close to zero, the low temperature fly height can be reduced.

TPTR has become an increasingly significant problem as head-media spacing (HMS) continuously decreases for higher density magnetic recording. The specified operating temperature range for drives is excess of 50° C. and the transducer temperature varies linearly with and is higher than the ambient air temperature inside the drive by 10° C. or more. Long write operations also raise head temperatures significantly by joule heating of coils. Current transducing heads contain many materials with a higher CTE than the substrate, commonly made of AlTiC. The materials of the transducing heads include permalloy, CoNiFe, gold, copper, and photo resist. Relative to the AlTiC substrate, these high CTE materials cause transducing head structures to protrude when the temperature rises and recess when the temperature drops. A common definition of TPTR is protrusion/recession distance per unit temperature change, generally in n"/° C.

TPTR affects magnetic transducer performance primarily in two ways. First, pole-tip protrusion at elevated temperatures increases the possibility of head disc contact. TPTR has proven to be a significant contributor to trailing edge wear of a slider. Mechanical reliability risk caused by large TPTR prohibits a low fly height and reduction in pole-tip recession. Low TPTR is one of the enablers for continuous HMS reduction, critical to higher recording areal density. Second, TPTR contributes to the cold write problem. Pole-tip recession at cold temperatures increases HMS. This degrades writablility, signal-to-noise ratio, and bit error rate at cold temperatures.

BRIEF SUMMARY OF THE INVENTION

The present invention is a transducing head including compensation structures having materials with a CTE lower than a CTE of the substrate. The compensation structures are located adjacent to large TPTR contributing features. Relative to the substrate, the low CTE compensation structures recess as temperatures rise and protrude as temperatures drop, exactly opposite to currently used high CTE materials that are sources of TPTR.

The present invention relates to a magnetic head having an air bearing surface. The magnetic head includes a substrate and a data transducer positioned upon the substrate adjacent the air bearing surface. The data transducer is comprised of a plurality of metallic layers. A compensation structure is positioned adjacent to at least one of the plurality of metallic layers, is either exposed at the air bearing surface or recessed slightly from the air bearing surface, and extends substantially perpendicular from the air bearing surface. The compensation structure is formed of a material having a coefficient of thermal expansion less than a coefficient of thermal expansion of a material forming the substrate.

DETAILED DESCRIPTION

Figure 1:
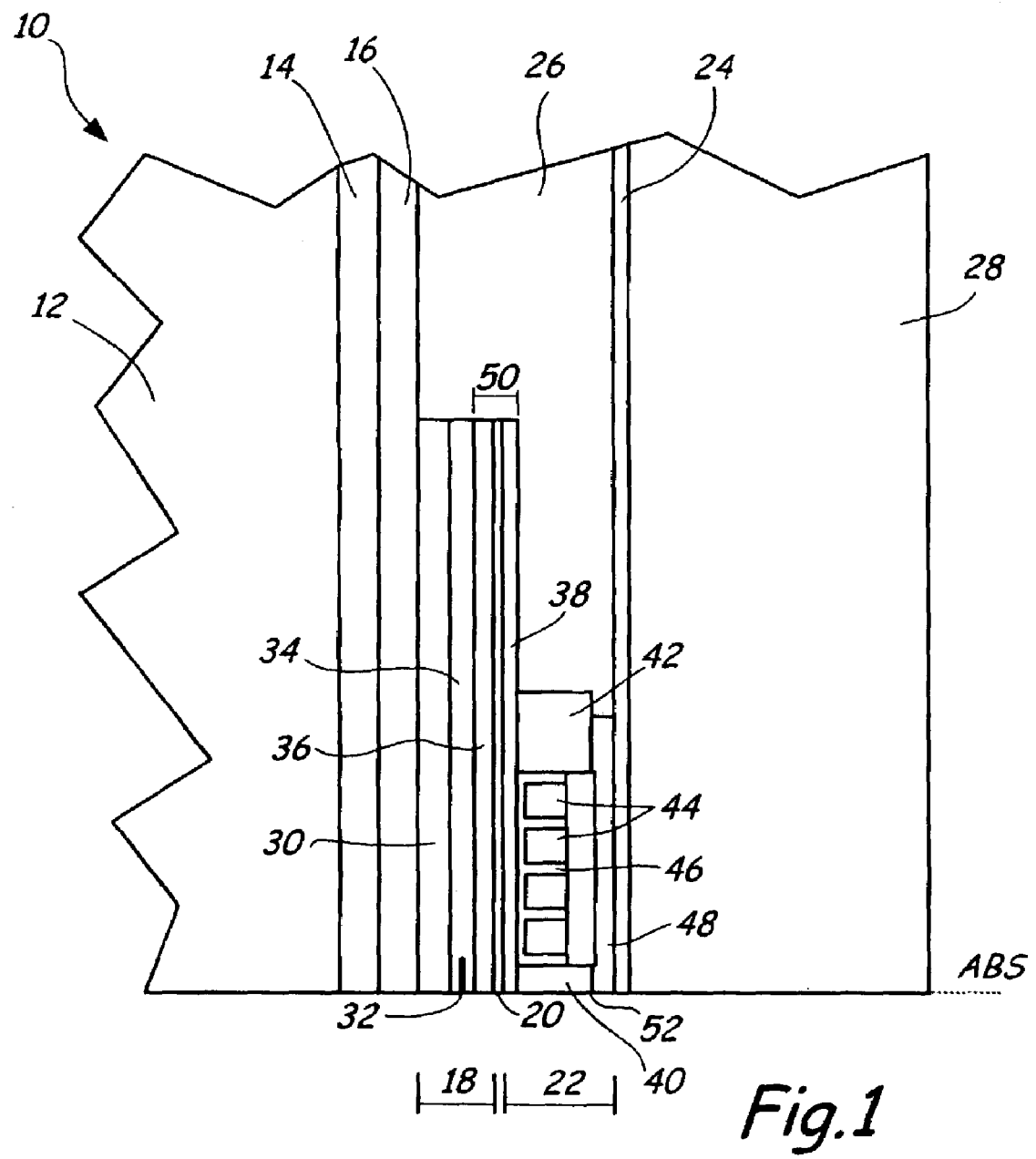
FIG. 1 is a partial cross-sectional view of a transducing head in accord with the present invention.

FIG. 1 is a partial cross-sectional view of a transducing head 10 in accord with the present invention. The cross-section of FIG. 1 is taken substantially normal to an air bearing surface (ABS) of transducing head 10.

Transducing head 10 includes a substrate 12, a basecoat 14, a first compensation structure 16, a reader 18, a spacer 20, a writer 22, a second compensation structure 24, an insulating layer 26 and an overcoat 28. Reader 18 includes a bottom shield 30, a read element 32, a read gap 34, and a top shield 36. Writer 22 includes a bottom pole 38, a shared pole extension 40, a back via 42, a conductive coil 44, a coil insulator 46, and a top pole 48. A shared pole 50 is formed by the combination of top shield 36, bottom pole 38 and spacer 20.

Basecoat 14 is deposited on substrate 12 and first compensation structure 16 is deposited upon basecoat 14. Reader 18 and writer 22 are each multi-layered devices, which are stacked upon first compensation structure 16 adjacent the ABS of transducing head 10. As shown in FIG. 1, reader 18 is formed on first compensation structure 16, and writer 22 is stacked on reader 18 in a piggyback configuration (in which layers are not shared between the two elements). In other embodiments not illustrated, reader 18 and writer 22 may be arranged in a merged-head configuration (in which layers are shared between the two elements) and/or writer 22 may be formed on first compensation structure 16 (with reader 18 being formed on writer 22). Co-planarly positioned with the layers of reader 18 and writer 22, and opposite the ABS of transducing head 10, is insulating layer 26. Second compensation structure 24 is deposited on top of writer 22 and overcoat 28 is formed upon second compensation structure 24.

Substrate 12 is typically formed of AlTiC, TiC, Si, SiC, $Al_2O_3$, or other composite materials formed of combinations of these materials. Of these materials, AlTiC and TiC have relatively large coefficients of thermal expansion (CTE), typically in the range of about $6.0 \times 10^{-6}/°$ C. to about $9.0 \times 10^{-6}/°$ C., while silicon has a lower CTE, in the range of about $2.3 \times 10^{-6}/°$ C. to about $2.4 \times 10^{-6}/°$ C.

Basecoat 14 is formed on substrate 12 in transducing head 10 shown in FIG. 1, although other embodiments may have basecoat 14 formed in an alternative location. Basecoat 14 is generally formed of an insulating material, such as $Al_2O_3$, AlN, $SiO_2$, $Si_3N_4$, or $SiO_{0-2}N_{0-1.5}$. Generally the insulating material for basecoat 14 is selected to most closely match the chemical and mechanical properties of the material used as substrate 12. For example, an $Al_2O_3$ basecoat is commonly used in conjunction with an AlTiC substrate, since the two materials have similar CTE. Use of a basecoat formed of conductive materials, or no basecoat at all, is possible if other insulating arrangements utilized for leads, reader contact and coils are provided.

Reader 18 is formed on first compensation structure 16, and includes bottom shield 30, read element 32, read gap 34, and top shield 36. Read gap 34 is defined on the ABS between terminating ends of bottom shield 30 and top shield 36. Read element 32 is positioned in read gap 34 adjacent the ABS. Read gap 34 insulates read element 32 from bottom shield 30 and top shield 36. Read element 32 may be any variety of different types of read elements, such as an anisotropic magnetoresistive (AMR) read element, a giant magnetoresistive (GMR) read element, or a tunneling giant magnetoresistive (TGMR) read element. In operation, magnetic flux from a surface of a magnetic media causes rotation of a magnetization vector of MR read element 32, which in turn causes a change in electrical resistivity of MR read element 32. The change in resistivity of read element 32 can be detected by passing a current through read element 32 and measuring a voltage across read element 32. Other magnetic sensing technologies may also be used in the read element, such as Hall effect.

Writer 22 is formed on reader 18, and includes bottom pole 38, shared pole extension 40, back via 42, conductive coil 44, coil insulator 46, and top pole 48. Shared pole extension 40 and back via 42 are formed on bottom pole 38, with shared pole extension 40 being positioned adjacent the ABS and back via 42 being spaced away from the ABS. A write gap 52 is defined on the ABS between shared pole extension 40 and top pole 48. Top pole 48 is formed over shared pole extension 40 and extends from the ABS to back via 42. Conductive coil 44 is positioned in coil insulator 46 between bottom pole 38 and top pole 48, wrapping around back via 42, such that the flow of electrical current through conductive coil 44 generates a magnetic field across write gap 52. Other embodiments of writer 22 do not use shared pole extension 40, but rather use a two-piece top pole structure instead.

Transducing head 10 is a piggyback configuration in which top shield 36 of reader 18 and bottom pole 38 of writer 22 are made of separate layers. Although not illustrated, transducing head 10 may also be arranged in a merged-head configuration in which shared pole 50 serves as top shield 36 for reader 18 and bottom pole 38 for writer 22, or in a merged-head configuration in which reader 18 is built upon writer 22.

Spacer 20 is formed between reader 18 and writer 22 and positioned adjacent the ABS. Spacer 20 is formed of a non-magnetic material, such as NiPd or alumina, and functions to magnetically separate reader 18 and writer 22. Generally, spacer 20 has a CTE greater than the substrate CTE.

Each of bottom shield 30, top shield 36, bottom pole 38, shared pole extension 40, back via 42, and top pole 48 are formed of metallic materials. Preferably, each of these components is formed of an alloy primarily composed of Fe, Ni, and/or Co. Such metallic alloys typically have large CTE's. For example, Permalloy a composition with about 80% Ni-20% Fe or 79% Ni-21% Fe has a CTE in the range of about $10.0 \times 10^{-6}/°$ C. to $13.0 \times 10^{-6}/°$ C.

Read gap 34 is generally formed of an insulating material such as $Al_2O_3$. Coil 44 is generally formed of an electrically-conductive metal such as copper, gold, or silver. Most commonly used is copper, which has a CTE in the range of about $16.0 \times 10^{-6}/°$ C. to $18.0 \times 10^{-6}/°$ C. Coil insulator 46 is generally formed from a cured photoresist having a large CTE, or from other insulating materials, such as AlN, $SiO_2$, and $Si_3N_4$.

Not shown in FIG. 1 are electrical leads and contacts to read element 32 and coil 44. The electrical leads and contacts are typically formed of metals, such as copper, tantalum, gold, or other metallic elements and alloys.

Insulating layer 26 is positioned in-plane with layers of reader 18 and writer 22 of transducing head 10, opposite the ABS. Insulating layer 26 is preferably formed of an insulating material, such as aluminum oxides, aluminum nitrides, silicon oxides, silicon nitrides, and silicon oxide nitrides.

In the embodiment of the present invention shown in FIG. 1, two compensation layers are utilized. First compensation structure 16 is located on top of basecoat 14 and beneath bottom shield 30 and second compensation structure 24 is located on top of top pole 48 of writer 22 and beneath overcoat 28. Both compensation structures 16, 24 are about 90 microns by about 90 microns square blocks. However, the thickness of compensation structures 16, 24 is between about 0.1 micron and about 10.0 microns.

First compensation structure 16 is deposited upon basecoat 14 and is formed between substrate 12 and reader 18. Second compensation structure 24 is deposited upon insulating layer 26 and is formed between writer 22 and overcoat 28. Preferably, compensation structure 16, 24 are formed of tungsten (W) which is a low CTE compensation material and has a CTE of about $4.4 \times 10^{-6}/°$ C. However, many other low CTE materials may be used as compensation structures 16, 24 and can be, but are not limited to, element or alloy metals, dielectric, and semiconductor materials. Examples of such materials that may be used are W, Ru, Mo, Cr, Si, Ta, Zr, Hf, Os, Ge, Re, C, Ta, Ce, B, Ir, and alloys including significant atomic percentage of the above elements, NiFe, TiW, BN, silicon oxides, silicon nitrides, silicon oxide nitrides, silicon carbides, aluminum nitrides, aluminum oxides, aluminum oxide nitrides, zinc oxides, tungsten carbides, aluminum antimonides, aluminum arsenide, cadmium selenides, cadmium sulfides, cadmium tellurides, gallium antimonides, gallium arsenides, gallium phosphide, indium antimonides, indium arsenide, indium phosphide, mercury tellurides, and copper gallium selenides. Compensation structures 16, 24 are formed in a wafer process during fabrication of transducing head 10 using many common wafer processes, such as deposition, pattern definition, and photolithography.

Overcoat 28 is formed over second compensation structure 24 in the embodiment shown in FIG. 1, and generally is formed over writer 22. Overcoat 28 is typically formed of an insulating material, such as $Al_2O_3$, AlN, $SiO_2$, $Si_3N_4$, and $SiO_{0-2}N_{0-1.5}$.

The layers of transducing head 10 all have differing mechanical and chemical properties. Due to these differing properties, the layers of transducing head 10 will be lapped at different rates. Thus, the lapping of the ABS of transducing head 10 during fabrication results in transducing head 10 having an uneven ABS. Commonly, a greater amount of the metallic layers of transducing head 10 will be removed during the lapping process than will be removed from substrate 12, resulting in a pole tip recession (PTR) of the metallic layers with respect to substrate 12. The PTR of a particular layer is defined as the distance perpendicular to the ABS between the ABS of substrate 12 and the ABS of that layer.

The differing mechanical and chemical properties of the layers of transducing head 10 further affect the ABS of transducing head 10 during operation. The CTE of materials used in forming substrate 12 is typically much smaller than the CTE of the materials used in forming the metallic layers of transducing head 10. Due to the larger CTE of the metallic layers, those layers tend to expand a greater amount than substrate 12. Thus, when transducing head 10 is subjected to a high operating temperature, the metallic layers protrude closer to the magnetic disc than substrate 12, thereby affecting the PTR of the metallic layers of transducing head 10. This change is PTR caused by the temperatures referred to as the Thermal PTR (TPTR).

The present invention addresses the problem of TPTR by using compensation structures to compensate for the high CTE of the metallic layers of transducing head 10. Generally, the compensation structures are located adjacent to or close to high CTE materials that are the large TPTR contributing factors of transducing head 10. The compensation structures extend substantially perpendicular to and rearward from the ABS of transducing head 10 and lie substantially parallel to substrate 12 and/or basecoat 14 of transducing head 10. One or more compensation structures may be located in transducing head 10 and interspersed between the metallic layers of transducing head 10, as discussed below. Relative to substrate 12, the low CTE materials of the compensation structure recess as the operating temperature rises and protrudes as the operating temperature drops, exactly opposite to the high CTE materials that are sources of TPTR found in transducing head 10. In addition to having a low CTE, the compensation structures also have a high modulus of elasticity, which is desirable because it gives the compensation structure enough elastic stiffness to constrain the adjacent layers and reduce the relative protrusion. For example, a compensation structure formed of W has a modulus of elasticity of about 400 GPa.

The compensation structures can be various types, such as sheet film, pattern blocks, multi-layers, or conformal overcoats. Generally, the compensation layer is positioned and located adjacent to or close to high CTE layers that are the TPTR contributing features of transducing head 10. By appropriately selecting the material and size of the compensation structure, the compensation structure will counterbalance for the larger CTE of the metallic layers. The compensation structures maintain the TPTR close to zero, thereby enabling the fly height to remain low and enhance the performance of transducing head 10. At high operating temperatures, the compensation structures recess relative to substrate 12, pulling back adjacent protruding metallic layers of transducing head 10, such as the shields and poles. As the operating temperature drops, the compensation structures protrude relative to the high CTE material and reduce recession.

The thicker the compensation layer, the greater reduction of TPTR is expected. However, as the thickness of the compensation structure increases negative TPTR occurs at cold temperatures, that is protrusion of the metallic layers occurs at cold temperatures. To minimize the head disc contact risk at both hot and cold temperatures, maximum protrusion at highest and lowest transducer temperatures needs to be balanced. First compensation structure 16 has a thickness between about 0.1 micron and about 10 microns, while second compensation structure 24 has a thickness between about 0.1 microns to about 50 microns.

Figure 2:
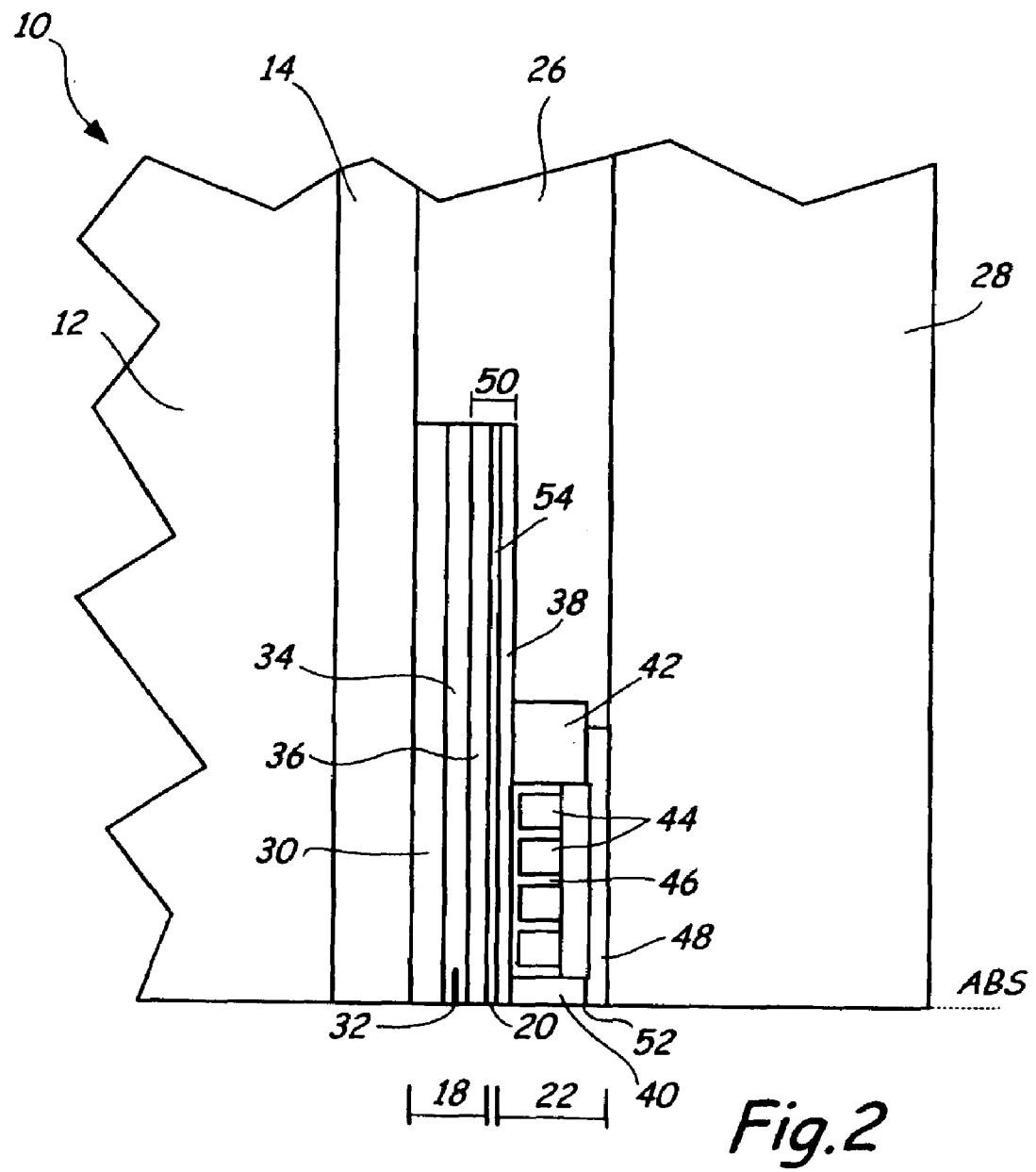
FIG. 2 is a partial cross-sectional view of another embodiment of a transducing head in accord with the present invention.

FIG. 2 is a partial cross-section view of transducing head 10 in accord with another embodiment of the present invention, the cross-section is taken substantially normal to the ABS of transducing head 10. Transducing head 10 includes substrate 12, basecoat 14, reader 18 (which includes bottom shield 30, read element 32, read gap 34, and top shield 36), a compensation layer 54, writer 22 (which includes bottom pole 38, shared pole extension 40, back via 42, conductive coil 44, coil insulator 46, and top pole 48), insulating layer 26, and overcoat 28.

Compensation layer 54 is positioned between reader 18 and writer 22, and more particularly between top shield 36 and bottom pole 38. The low CTE compensation layer 54 of this embodiment replaces the non-magnetic spacer shown in FIG. 1, which has a high CTE. This embodiment of transducing head 10, with compensation layer 54 located between reader 18 and writer 22, has the advantage of having a low CTE layer adjacent the largest TPTR contributing features where it is most effective to reduce protrusion. The thickness of compensation layer 54 may be between about 0.10 microns to about 5.0 microns.

Figure 3:
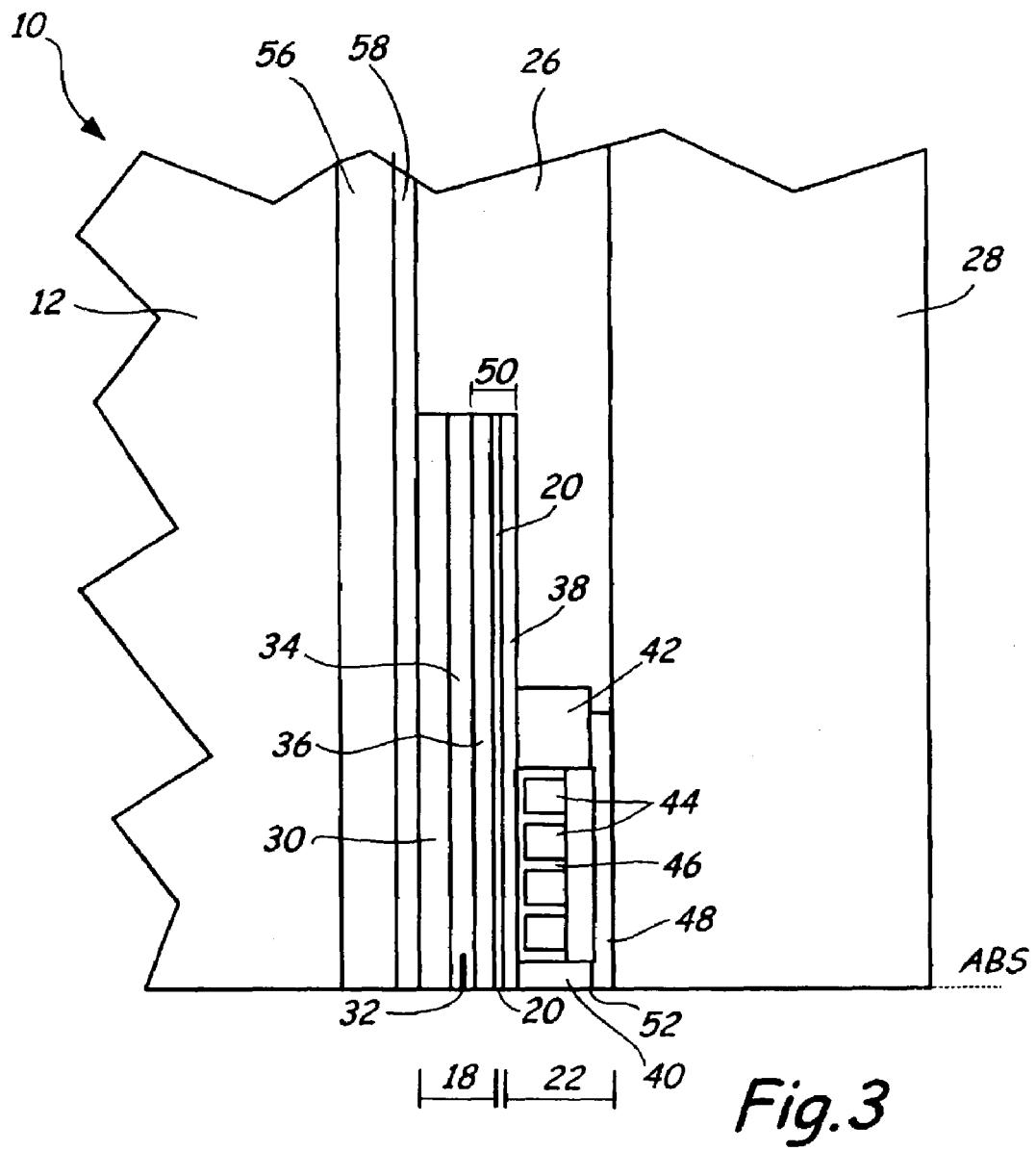
FIG. 3 is a partial cross-sectional view of another embodiment of a transducing head in accord with the present invention.

FIG. 3 is a partial cross-sectional view of transducing head 10 in accord with another embodiment of the present invention. The cross-section of FIG. 3 is taken substantially normal to the ABS of transducing head 10. Transducing head 10 includes substrate 12, a compensation structure basecoat 56, an insulating layer 58, reader 18 (which includes bottom shield 30, read element 32, read gap 34, and top shield 36), spacer 20, writer 22 (which includes bottom pole 38, shared pole extension 40, back via 42, conductive coil 44, coil insulator 46, and top pole 48), insulating layer 26, and overcoat 28.

Compensation structure basecoat 56 is deposited on substrate 12. Reader 18 and writer 22 are each multi-layered devices stacked upon basecoat 56 adjacent the ABS of transducing head 10. Non-magnetic spacer 20 separates reader 18 and writer 22.

Compensation structure basecoat 56 has a thickness in the range of about 0.1 micron to about 10 microns. The pullback force of compensation structure 56 translates through an insulating layer 58 to counteract the protrusion from the shields. Thus, the compensation effect of compensation structure basecoat 56 persists. Compensation structure 56 is a preferably a block or sheet film. It is ideal to place the low CTE compensation structure 56 adjacent to high CTE materials, such as shields and poles, that protrude the most at elevated temperatures. However, oftentimes compensation structure 56 should be separated from the TPTR contributing features for process and/or performance reasons. Placing compensation structure 56 close to, but not adjacent to the TPTR features still has the effect of reducing TPTR, as long the separation is reasonably small.

Figure 4:
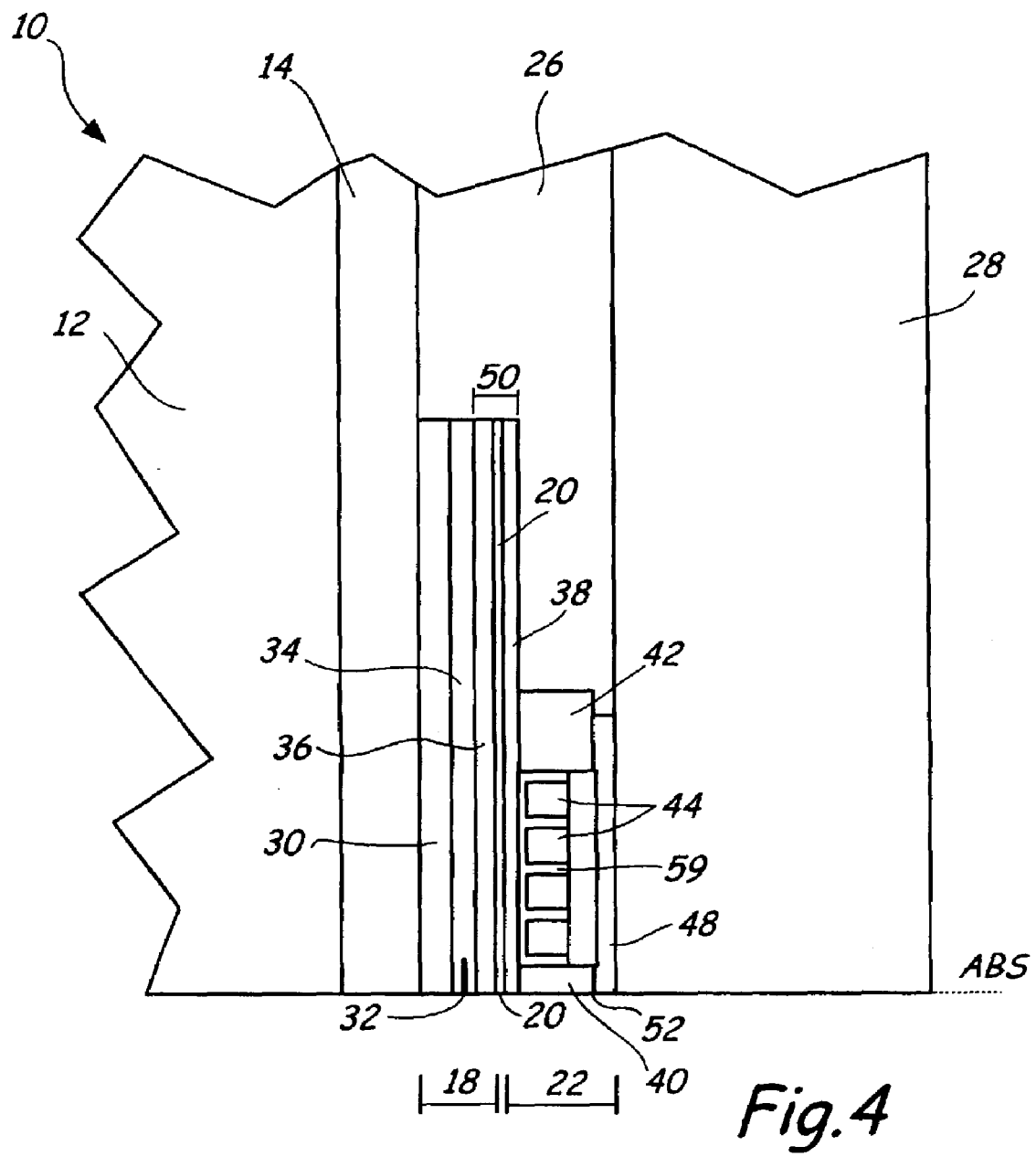
FIG. 4 is a partial cross-sectional view of another embodiment of a transducing head in accord with the present invention.

FIG. 4 is a partial cross-sectional view of transducing head 10 in accord with another embodiment of the present invention. The cross-section of FIG. 4 is taken substantially normal to the ABS of transducing head 10. Transducing head 10 includes substrate 12, basecoat 14, reader 18 (which includes bottom shield 30, read element 32, read gap 34, and top shield 36), spacer 20, and writer 22, insulating layer 26, and overcoat 28. Writer 22 of the present embodiment includes bottom pole 38, shared pole extension 40, back via 42, conductive coil 44, a compensation coil insulator 59, and top pole 48. Compensation coil insulator 59 is deposited between top pole 48 and bottom pole 38 to counteract the protrusion from the poles and reduce TPTR of transducing head 10.

FIGS. 5–12 are schematic diagrams of TPTR compensation schemes using a low CTE material as the compensation structure formed in a portion of transducing head 10. The figures show various embodiments of the present invention transducing head 10 having compensation structures positioned in head 10 adjacent to or nearby high CTE materials.

Figure 5:
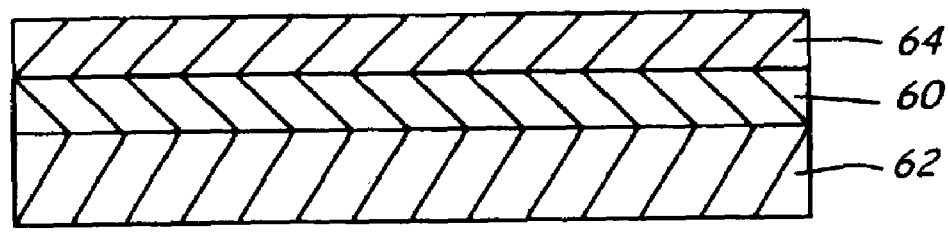
FIGS. 5–12 are schematic diagrams of material layers of transducing heads of the present invention.

FIG. 5 illustrates a TPTR compensation scheme using a low CTE material compensation structure 60 as a basecoat on top of a substrate 62. The rest of the transducer structure is then built upon compensation basecoat 60. Only a bottom shield 64 is shown in this illustration and the rest of the transducer features are not shown. Bottom shield 64 is formed upon compensation basecoat 60. This embodiment is similar to the embodiment shown and discussed with respect to FIG. 3.

Figure 6:
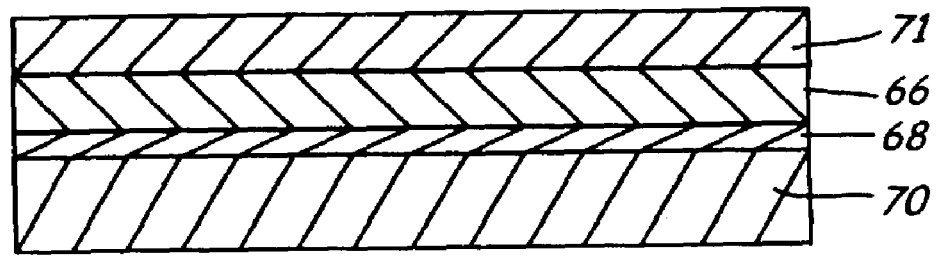

FIG. 6 shows a compensation scheme having a compensation layer 66 formed upon a basecoat 68, which is formed on top of a substrate 70. The rest of the transducer features 71 and structures are built on top of compensation layer 66. This embodiment is similar to the embodiment shown and discussed with respect to FIG. 1.

Figure 7:
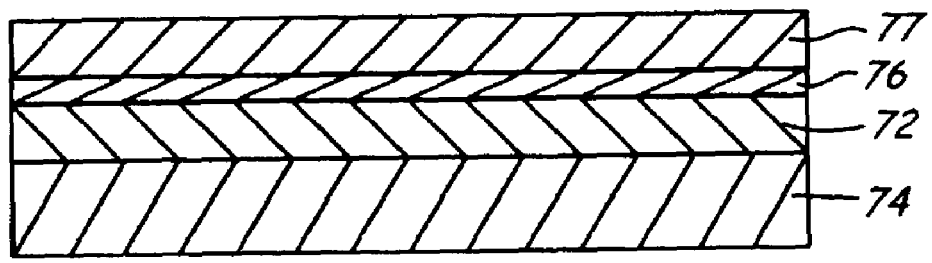

FIG. 7 illustrates a compensation scheme utilizing a compensation structure 72 as a first layer, or basecoat, on the top of a substrate 74. Other layers 76, such as dielectric layers, are formed on top of compensation structure 72 to separate it from the rest of transducer structure 77. The separation between compensation structure 72 and the TPTR structures is reasonably small and retains the effect of reducing TPTR.

Figure 8:
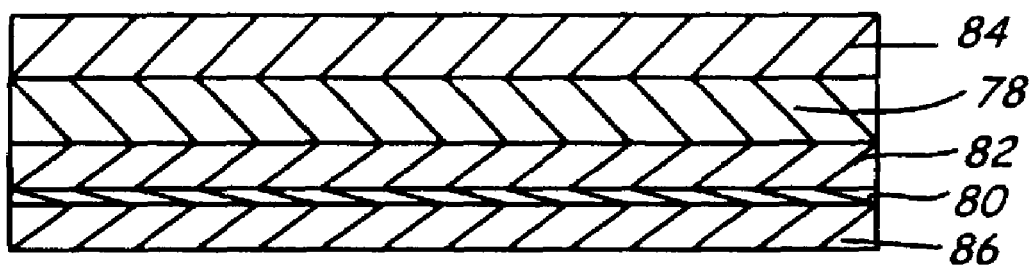

FIG. 8 illustrates the TPTR compensation scheme using a low CTE, non-magnetic material as a spacer 78 separating a reader 80 and a writer, and more particularly a top shield 82 and a bottom pole 84. The remainder of the transducing head located below a bottom shield 86 is not shown. This embodiment is similar to the embodiment shown in FIG. 2.

Figure 9:
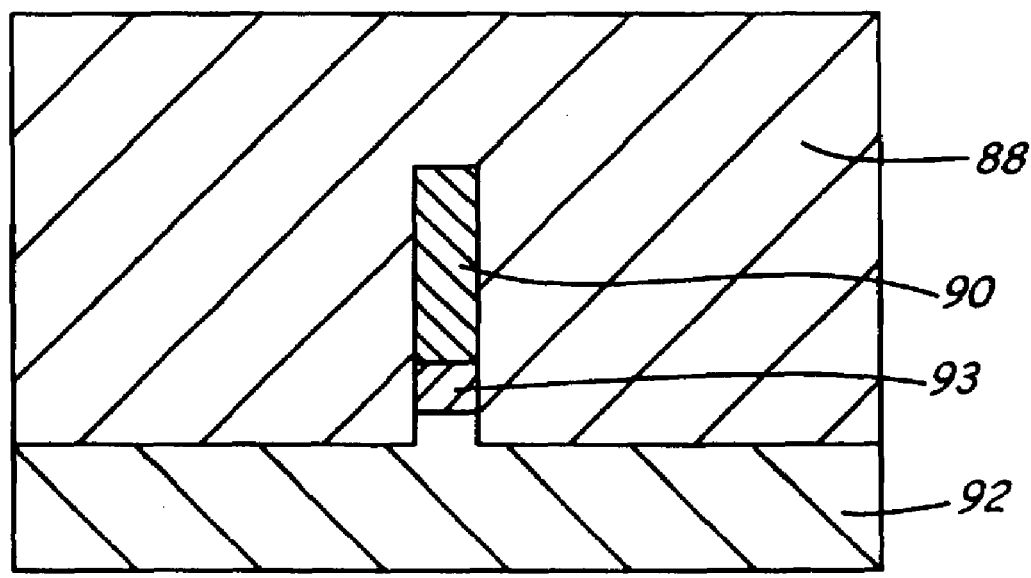

FIG. 9 illustrates a compensation scheme using a low CTE non-magnetic material as an overcoat 88, which encapsulates a top pole 90 and a bottom pole 92 of a writer. A write gap 93 is located between top pole 90 and bottom pole 92. The remainder of the transducing head located below bottom pole 92 is not shown.

Figure 10:
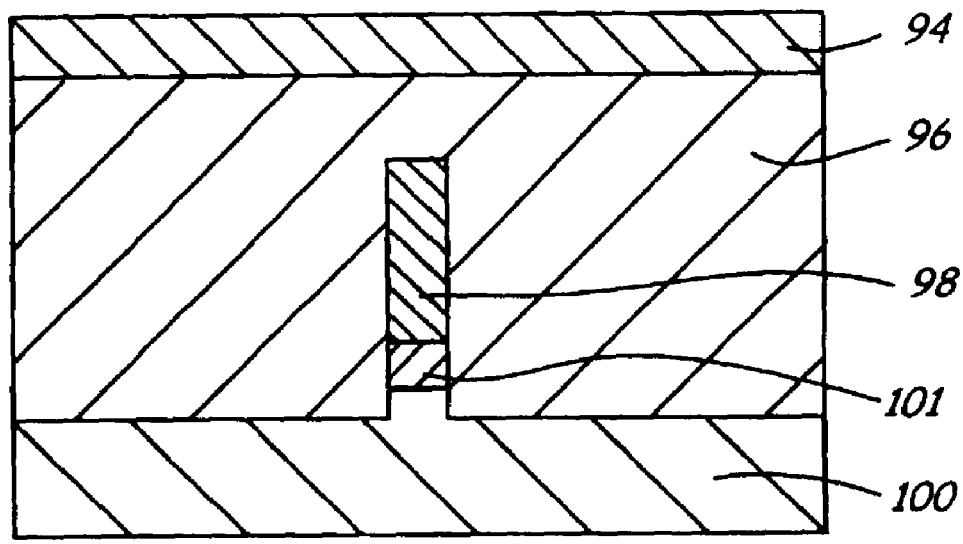

FIG. 10 illustrates a compensation scheme with a low CTE material layer 94 formed on top of an overcoat 96. Overcoat 96 encapsulates a top pole 98 and a bottom pole 100. A write gap 101 is located between the top pole 98 and bottom pole 100.

Figure 11:
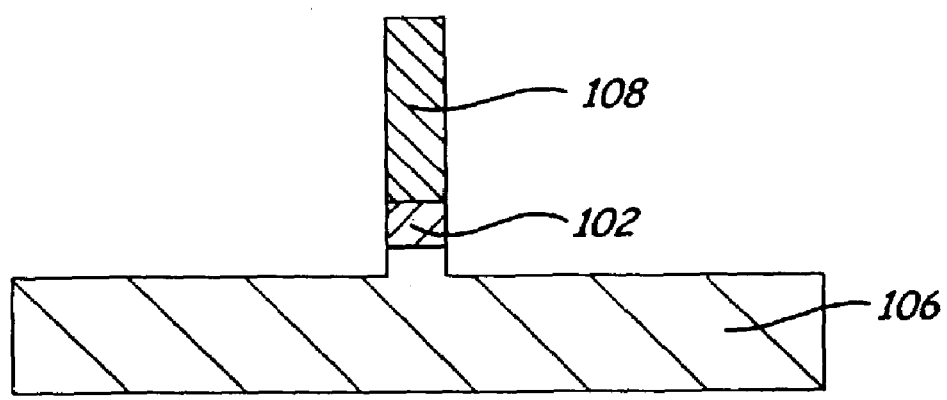

FIG. 11 illustrates a compensation scheme using a low CTE non-magnetic material 102 in a writer gap between a bottom pole 106 and a top pole 108.

Figure 12:
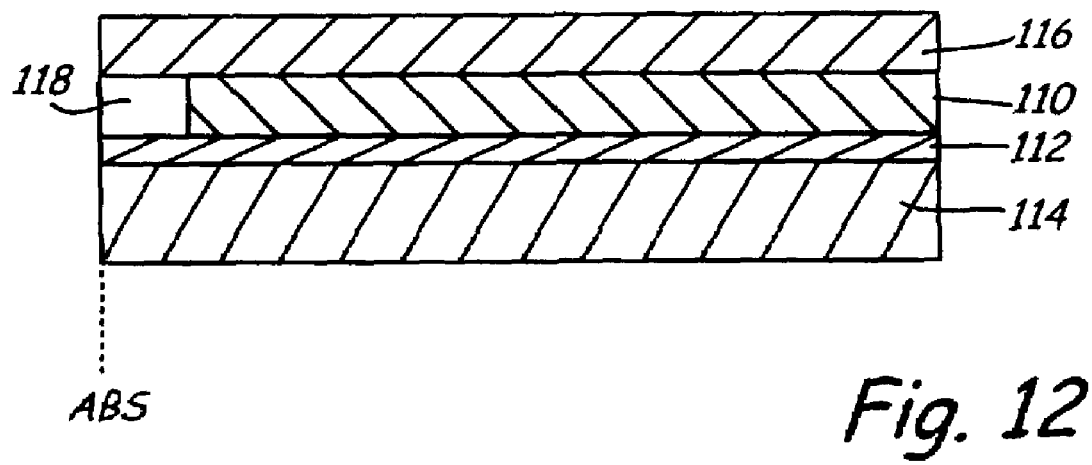

The previous embodiments have shown the compensation layers exposed at the ABS. However, further embodiments of the present invention include compensation layers recessed from the ABS, as illustrated in FIG. 12. FIG. 12 illustrates a compensation scheme with a low CTE material compensation structure 110 recessed from the ABS of transducing head 10. Compensation layer 110 is formed upon a basecoat 112, which is formed on top of a substrate 114. The remaining transducer features 116 and structure are built on top of compensation layer 110. Compensation layer 110 is recessed from the ABS of transducing head 10. Compensation layer 110 is recessed no more than 10 microns from the ABS. Recession of the compensation layer has the advantage of avoiding potential corrosion and protrusion problems due to the material properties of the low CTE materials selected for the compensation layer. A filler material 118 is deposited between the recessed compensation layer and the ABS. Alumina, or any other material that would not provide a corrosion issue and has a similar lapping rate as the other materials of transducing head 10, forms filler material 118.

The present invention reduces thermal pole tip protrusion and recession in a transducing head. One or more compensation structures are positioned in the layers of the transducing head adjacent to or near to TPTR sources of the transducing head, such as the shields and poles forming the reader and writer. The structures are positioned substantially parallel to the metallic layers. The compensation structures are exposed at the ABS, or recessed slightly from the ABS, and extends substantially perpendicular from the ABS. The low CTE material compensation structures recess as temperatures rise and protrude as temperatures drop, relative to the substrate. Low TPTR enables continuous reduction of head disc spacing, which is critical with high recording areal density. The compensation layers have enough elastic stiffness to constrain the adjacent layers to reduce the relative protrusion and pull back adjacent protruding structures.

Although the present invention has been described with reference to preferred embodiments, workers skilled in the art will recognize that changes may be made in form and detail without departing from the spirit and scope of the invention. For example, any of the compensation structures discussed with respect to FIGS. 1–11 may utilize a compensation layer exposed at the air bearing surface or recessed at the air bearing surface.

The invention claimed is:

1. A magnetic data storage and retrieval system comprising:
    a magnetic head having a substrate and a data transducer positioned upon the substrate, the data transducer comprising a plurality of metallic layers, each of the plurality of metallic layers being formed of a material having a coefficient of thermal expansion greater than a coefficient of thermal expansion of a material forming the substrate; and
    means for compensating a thermally-caused expansion of at least one metallic layer of the plurality of metallic layers, the means positioned adjacent and substantially parallel to a metallic layer;
    wherein the means for compensating is formed of a material selected from the group consisting of W, alloys including a significant atomic percentage of W, and silicon carbides.

2. The magnetic data storage and retrieval system of claim 1 wherein the means for compensating is formed of a material having a coefficient of thermal expansion less than the coefficient of thermal expansion of the material forming the substrate.

3. The magnetic data storage and retrieval system of claim 1 wherein the means for compensating is positioned between the substrate and the data transducer.

4. The magnetic data storage and retrieval system of claim 1, and further comprising a basecoat positioned between the substrate and the data transducer.

5. The magnetic data storage and retrieval system of claim 4 wherein the means for compensating is positioned between the basecoat and the data transducer.

6. The magnetic data storage and retrieval system of claim 5 wherein the means for compensating are positioned upon the data transducer.

7. The magnetic data storage and retrieval system of claim 1 wherein the data transducer is comprised of a reader positioned upon the substrate and a writer positioned upon the reader, the means for compensating being positioned between the reader and the writer.

8. The magnetic data storage and retrieval system of claim 1, and further comprising an overcoat positioned upon the data transducer wherein the means for compensating is positioned upon the overcoat.

9. The magnetic data storage and retrieval system of claim 1 wherein the means for compensating is exposed at an air bearing surface of the magnetic head.

10. The magnetic data storage and retrieval system of claim 1 wherein the means for compensating is recessed from an air bearing surface of the magnetic head by no more than 10 microns.

11. A magnetic head having an air bearing surface and comprising:
    a substrate;
    a data transducer positioned upon the substrate adjacent the air bearing surface, the data transducer comprising a plurality of metallic layers; and
    a compensation structure positioned adjacent and substantially parallel to at least one of the plurality of metallic layers, wherein the compensation structure is formed of a material selected from the group consisting of W, alloys including a significant atomic percentage of W, and silicon carbides.

12. The magnetic head of claim 11 wherein the compensation structure is positioned between the substrate and the data transducer.

13. The magnetic head of claim 11, and further comprising a basecoat positioned between the substrate and the data transducer.

14. The magnetic head of claim 13 wherein the compensation structure is positioned between the basecoat and the data transducer.

15. The magnetic head of claim 14 and further comprising a second compensation structure is positioned upon the data transducer.

16. The magnetic head of claim 11 wherein the compensation structure is exposed at the air bearing surface.

17. The magnetic head of claim 11 wherein the compensation structure is recessed from the air bearing surface by no more than 10 microns.

18. The magnetic head of claim 17, and further comprising a filler material deposited between the recessed compensation structure and the air bearing surface.

19. The magnetic head of claim 11 wherein the data transducer comprises:
    a bottom shield;
    a shared pole comprising a top shield and a bottom pole;
    a top pole separated from the bottom pole at the air bearing surface by a write gap and in contact with the bottom pole opposite the air bearing surface;
    a conductive coil arranged such that at least a portion of the conductive coil is positioned between the bottom and top poles; and
    a coil insulator positioned between the bottom and top poles for insulating the conductive coil therefrom.

20. The magnetic head of claim 19 wherein the compensation structure is positioned between the top shield and the bottom pole.

21. The magnetic head of claim 19 wherein the compensation structure forms the coil insulator.

22. A magnetic head having an air bearing surface and comprising:
    a substrate;
    a data transducer positioned upon the substrate and including a plurality of metallic layers, the data transducer comprising:

a reader positioned upon the substrate;

a writer positioned upon the reader; and a compensation layer exposed at the air bearing surface and extending away from the air bearing surface, the compensation layer being formed of a material selected from the group consisting of W, alloys including a significant atomic percentage of W, and silicon carbides.

23. The magnetic head of claim 22 wherein the compensation layer is positioned between the substrate and the reader.

24. The magnetic head of claim 22, and further comprising a basecoat positioned between the substrate and the reader.

25. The magnetic head of claim 24 wherein the compensation layer is positioned between the basecoat and the reader.

26. The magnetic head of claim 22 wherein a second compensation layer is positioned upon the writer.

27. The magnetic head of claim 22 wherein the compensation layer is positioned between the reader and the writer.

28. The magnetic head of claim 22, and further comprising an overcoat positioned upon the data transducer.

29. The magnetic head of claim 28 wherein the compensation layer is positioned upon the overcoat.

30. The magnetic head of claim 22 wherein the compensation layer is positioned upon the writer.

31. The magnetic head of claim 22 wherein the compensation layer is formed of a non-magnetic material.

32. The magnetic head of claim 22 wherein the compensation layer is formed of a conductive material.

33. The magnetic head of claim 22 wherein the compensation layer has a thickness between about 0.1 microns and about 50.0 microns.

34. The magnetic head of claim 11 wherein the compensation layer has a thickness between about 0.1 microns and about 50.0 microns.

* * * * *